(12) United States Patent
Kim et al.

(10) Patent No.: US 10,047,248 B2
(45) Date of Patent: Aug. 14, 2018

(54) SLURRY COMPOSITION FOR CHEMICAL MECHANICAL POLISHING, METHOD OF PREPARING THE SAME, AND POLISHING METHOD USING THE SAME

(71) Applicant: Samsung Electronics Co., Ltd., Suwon-si, Gyeonggi-do (KR)

(72) Inventors: Ye-hwan Kim, Seoul (KR); Un-gyu Paik, Seoul (KR); Ji-hoon Seo, Seoul (KR)

(73) Assignees: Samsung Electronics Co., Ltd., Gyeonggi-do (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 15/293,816

(22) Filed: Oct. 14, 2016

(65) Prior Publication Data

US 2017/0107404 A1    Apr. 20, 2017

(30) Foreign Application Priority Data

Oct. 15, 2015 (KR) .......................... 10-2015-0144315

(51) Int. Cl.
*C09G 1/02* (2006.01)
*B24B 37/04* (2012.01)

(52) U.S. Cl.
CPC .............. *C09G 1/02* (2013.01); *B24B 37/044* (2013.01)

(58) Field of Classification Search
None
See application file for complete search history.

(56) References Cited

U.S. PATENT DOCUMENTS

| 6,372,003 | B1 | 4/2002 | Kasai et al. | |
| 7,429,338 | B2 | 9/2008 | Siddiqui | |
| 8,034,252 | B2 | 10/2011 | Yamashita | |
| 8,361,176 | B2 | 1/2013 | Seth et al. | |
| 2009/0013609 | A1* | 1/2009 | Gupta | C09G 1/02 51/309 |
| 2009/0047870 | A1* | 2/2009 | Siddiqui | B24B 37/044 451/36 |
| 2010/0111789 | A1* | 5/2010 | Fajardie | B01D 53/945 423/213.2 |
| 2012/0322346 | A1 | 12/2012 | Iwano et al. | |
| 2016/0280962 | A1* | 9/2016 | Zhou | C09G 1/02 |
| 2017/0088748 | A1* | 3/2017 | Stender | H01L 21/31053 |

FOREIGN PATENT DOCUMENTS

| JP | 2007-299942 A | 11/2007 |
| KR | 10-0565418 B1 | 3/2006 |
| KR | 10-1091532 B1 | 12/2011 |
| KR | 2013-0136593 A | 12/2013 |
| KR | 10-1427883 B1 | 8/2014 |
| KR | 10-1470980 B1 | 12/2014 |

* cited by examiner

*Primary Examiner* — Shamim Ahmed
(74) *Attorney, Agent, or Firm* — Harness, Dickey, & Pierce, P.L.C.

(57) ABSTRACT

A slurry composition for the CMP process includes a dispersion medium, and ceria particles having a $NO_3$ functional group bonded to surfaces thereof. The ceria particles are contained in an amount of about 0.1 parts by weight to about 15 parts by weight based on 100 parts by weight of the dispersion medium.

17 Claims, 19 Drawing Sheets

SLURRY COMPOSITION FOR CHEMICAL MECHANICAL POLISHING, METHOD OF PREPARING THE SAME, AND POLISHING METHOD USING THE SAME

CROSS-REFERENCE TO RELATED APPLICATION

This application claims the benefit of Korean Patent Application No. 10-2015-0144315, filed on Oct. 15, 2015, in the Korean Intellectual Property Office, the disclosure of which is incorporated herein in its entirety by reference.

BACKGROUND

1. Field

Example embodiments of the inventive concepts relate to a slurry composition for a chemical mechanical polishing (CMP) process, a method of preparing the slurry composition, and a polishing method using the slurry composition, and more particularly, to a slurry composition for a CMP process, by which semiconductor products may be more rapidly manufactured in a higher yield, a method of manufacturing the slurry composition, and a polishing method using the slurry composition.

2. Description of the Related Art

With a reduction in linewidth of semiconductor devices, a lower limit of defects or particles that affect yield has also decreased. Thus, even fine defects or particles that were out of the question in the past may affect yield of semiconductor devices having reduced linewidths. A reduction in the size of polishing particles used in a CMP process may be required to reduce the size of defects or particles. Because the reduction in the size of polishing particles involves reducing a polishing rate, productivity may be dropped.

SUMMARY

Example embodiments of the inventive concepts provides a slurry composition for a chemical mechanical polishing (CMP) process, by which semiconductor products may be rapidly manufactured in relatively high yield.

Example embodiments of the inventive concepts also provides a method of preparing a slurry composition for a CMP process, by which semiconductor products may be rapidly manufactured in relatively high yield.

Furthermore, example embodiments of the inventive concepts provide a CMP method capable of rapidly manufacturing semiconductor products in relatively high yield.

In addition, example embodiments of the inventive concepts provide a method of rapidly manufacturing semiconductor products in relatively high yield.

According to example embodiments of the inventive concepts, a slurry composition for a CMP process includes a dispersion medium, and ceria particles having a $NO_3$ functional group bonded to surfaces thereof. The ceria particles are contained in an amount of about 0.1 parts by weight to about 15 parts by weight based on 100 parts by weight of the dispersion medium.

A pH value of the slurry composition may range from 1 to 9. The slurry composition may further include a pH control agent.

A Fourier-transform infrared spectroscopy (FT-IR) spectrum for the ceria particles may have a peak at a position ranging from about 1250 cm−1 to about 1400 cm−1 or at a position ranging from about 1500 cm−1 to about 1700 cm−1. A zeta potential value of the ceria particles may be larger than 0 in at least a pH range of 0 to 9.5.

A polishing accelerator may not be included in the slurry composition. An oxidizer may not be included in the slurry composition.

The ceria particles may have an average particle diameter of about 1 nm to about 150 nm. The ceria particles may have an average particle diameter of about 1 nm to about 80 nm.

According to example embodiments of the inventive concepts, a slurry composition for a CMP process includes ceramic particles having a surface-modifying functional group bonded to surfaces thereof, a pH control agent, and a dispersion medium. The surface-modifying functional group includes at least one of a nitrate group ($NO_3$), a carbonate group ($CO_3$), a sulfate group ($SO_4$), an oxalate group ($C_2O_4$), and a methane sulfonate group ($CH_3SO_3$).

The ceramic particles may include at least one of ceria, silica, alumina, and titania. The ceramic particles may have an average particle diameter of about 1 nm to about 150 nm. The ceramic particles may be contained in an amount of about 0.1 to 15 parts by weight based on 100 parts by weight dispersion medium.

A polishing accelerator may not be contained in the slurry composition. the polishing accelerator may be one of an anionic oligomer, an anionic polymer, hydroxyl acid, and amino acid.

According to example embodiments of the inventive concepts, a slurry composition includes a dispersion medium, and a plurality of ceramic particles having a surface-modifying functional group bonded to surfaces thereof. The slurry composition does not include an oxidizer.

The ceramic particles may include at least one of ceria, silica, alumina, and titania, and the surface-modifying functional group may include at least one of a nitrate group ($NO_3$), a carbonate group ($CO_3$), a sulfate group ($SO_4$), an oxalate group ($C_2O_4$), and a methane sulfonate group ($CH_3SO_3$). A polishing accelerator may not be contained in the slurry composition. The ceramic particles may be contained in an amount of about 0.1 to 15 parts by weight based on 100 parts by weight of the dispersion medium.

According to example embodiments of the inventive concepts, a polishing apparatus for a chemical mechanical polishing (CMP) process includes a platen including a polishing pad placed thereon, a slurry port configured to dispense the slurry composition of example embodiments on the polishing pad, and at least one carrier head 140 configured to hold a substrate against the polishing pad.

According to example embodiments of the inventive concepts, a method of manufacturing a slurry composition for a CMP process includes preparing a first mixture by mixing ceramic particles with a modifier, heating the first mixture to obtain modified ceramic particles, and separating the ceramic particles from the modifier and dispersing the ceramic particles in a dispersion medium to obtain the slurry composition. The modifier includes at least one of nitric acid, sulfuric acid, carbonic acid, oxalic acid, and methanesulfonic acid.

The ceramic particles may have an average particle diameter of about 1 nm to about 150 nm.

The method may further include controlling a pH value of the slurry composition, and the pH value of the slurry composition may be in a range of 1 to 9. Controlling the pH value of the slurry composition may include adding a pH control agent. The first mixture may be heated to a temperature of about 60° C. to about 150° C.

The ceramic particles may include at least one of ceria, silica, alumina, and titania.

The method may exclude adding a polishing accelerator or adding an oxidizer.

According to example embodiments of the inventive concepts, a method of polishing a substrate by a CMP process includes positioning the substrate on a polishing pad, supplying a slurry composition between the polishing pad and the substrate, and polishing the substrate with the polishing pad under a constant pressure. The slurry composition includes ceria particles and a dispersion medium. The ceria particles have $NO_3$ functional groups bonded to surfaces thereof. The ceria particles are included in an amount of about 0.1 parts by weight to about 15 parts by weight based on 100 parts by weight of the dispersion medium.

The ceria particles may have an average particle diameter of about 1 nm to about 150 nm, for example, an average particle diameter of about 1 nm to about 80 nm.

When the slurry composition for the CMP process has a pH value of about 7.0 and the constant pressure is about 4 psi, a silicon oxide layer on the substrate may be polished at a polishing rate of about 3000 Å/min to about 6000 Å/min.

When the slurry composition for the CMP process has a pH value of about 2.0 and the constant pressure is about 4 psi, a silicon oxide layer on the substrate may be polished at a polishing rate of about 400 Å/min to about 1000 Å/min.

When the slurry composition for the CMP process has a pH value of about 2.0 and the constant pressure is about 4 psi, a tungsten layer or a copper layer on the substrate may be polished at a polishing rate of about 400 Å/min to about 1000 Å/min.

When the slurry composition for the CMP process has a pH value of about 2.0 and the constant pressure is about 4 psi, a silicon nitride layer on the substrate may be polished at a polishing rate of about 50 Å/min to about 400 Å/min.

According to example embodiments of the inventive concepts, a method of manufacturing a semiconductor device includes forming a first material layer having a recess portion on a semiconductor substrate, forming a second material layer within the recess portion and on an entire surface of the first material layer, and polishing the second material layer by a chemical mechanical polishing process (CMP) process such that the second material layer is defined within the recess portion. The second material layer includes a material different from a material of the first material layer. Polishing the second material layer by the CMP process includes supplying a slurry composition between a polishing pad and the semiconductor substrate, and polishing the semiconductor substrate with the polishing pad under a constant pressure. The slurry composition includes ceramic particles, a pH control agent, and a dispersion medium. The ceramic particles have a surface-modifying functional group bonded to surfaces thereof. The surface-modifying functional group includes at least one of a nitrate group ($NO_3$), a carbonate group ($CO_3$), a sulfate group ($SO_4$), an oxalate group ($C_2O_4$), and a methane sulfonate group ($CH_3SO_3$).

The ceramic particles may have an average particle diameter of about 1 nm to about 150 nm. The slurry composition may not include a polishing accelerator. Also, a pH value of the slurry composition for the CMP process may range from 1 to 9. The second material layer may be a metal layer, and a pH value of the slurry composition for the CMP process may range from 1 to 4.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
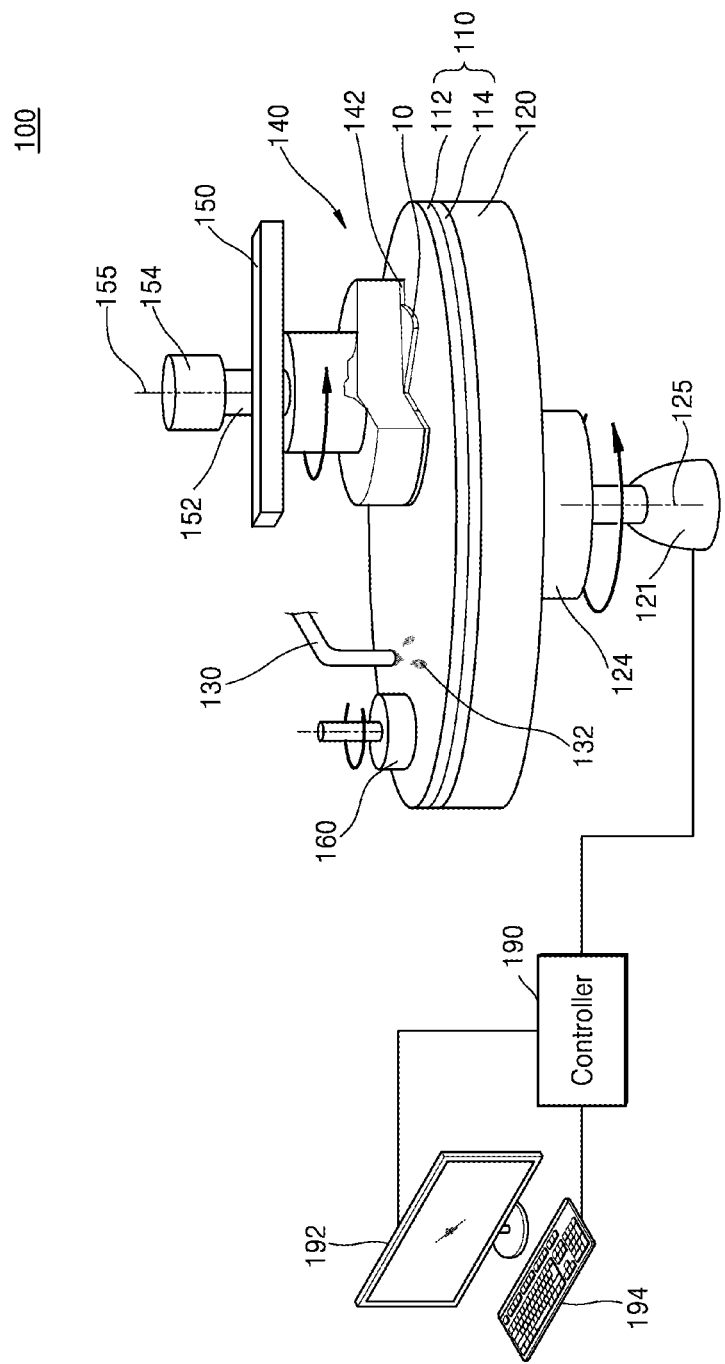
FIG. 1 is a conceptual perspective view of a polishing apparatus capable of a chemical mechanical polishing (CMP) process.

As used herein, the term "and/or" includes any and all combinations of one or more of the associated listed items. Expressions such as "at least one of," when preceding a list of elements, modify the entire list of elements and do not modify the individual elements of the list.

Example embodiments of the inventive concepts will now be described more fully hereinafter with reference to the accompanying drawings, in which example embodiments of the inventive concepts are shown. The inventive concepts may, however, be embodied in different forms and should not be construed as limited to the embodiments set forth herein. Rather, these embodiments are provided so that this disclosure is thorough and complete and fully conveys the scope of example embodiments of the inventive concepts to one skilled in the art. Like numbers refer to like elements throughout. In the drawings, the thicknesses of layers and regions are exaggerated for clarity. Accordingly, example embodiments of the inventive concepts are not limited by relative sizes or intervals in the appended drawings.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concepts.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and this specification and will not be interpreted in an idealized or overly formal sense unless explicitly so defined herein.

When some example embodiments may be embodied otherwise, respective process steps described herein may be performed otherwise. For example, two process steps described in a sequential order may be performed substantially the same time or in reverse order.

Variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. As used herein, the term "and/or" includes any and all combinations of one or more of the associated listed items. When a term "substrate" is used herein, it should be understood as either the substrate itself or both the substrate and a stack structure including a given or predetermined layer or film formed on the substrate. Also, when an expression "surface of the substrate" is used herein, it should be understood as either as an exposed surface of the substrate itself or an outer surface of a given or predetermined layer or film formed on the substrate.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

FIG. 1 is a conceptual perspective view of a polishing apparatus 100 capable of a chemical mechanical polishing (CMP) method.

Referring to FIG. 1, the polishing apparatus 100 may include a platen 120 having a rotating disc shape on which a polishing pad 110 is placed. The platen 120 may be capable of rotating about an axis 125. For example, a motor 121 may turn a driving axis 124 to rotate the platen 120. The polishing pad 110 may be a polishing pad having at least two layers including an outer polishing layer 112 and a backing layer 114 that is more flexible than the outer polishing layer 112.

The polishing apparatus 100 may include a slurry port 130 configured to dispense a polishing agent 132 (e.g., slurry) toward the polishing pad 110. The polishing apparatus 100 may include a polishing pad conditioner 160 configured to condition the polishing pad 110 so that the polishing pad 110 may be maintained in a consistent polishing state.

The polishing apparatus 100 may include at least one carrier head 140. The carrier head 140 may be configured to hold a substrate 10 against the polishing pad 110. The carrier head 140 may independently control polishing parameters (e.g., pressure) associated with each substrate.

In particular, the carrier head 140 may include a retaining ring 143 to hold the substrate 10 under a flexible membrane. The carrier head 140 may include a plurality of pressurizable chambers, which may be defined by the flexible membrane and controlled independently. The plurality of pressurizable chambers may independently apply controllable pressures to associated zones of the flexible membrane and the substrate 10.

The carrier head 140 may hang from a support structure 150 (e.g., a carousel or a track) and is connected to a carrier head rotational motor 154 by a driving axis 152, and the carrier head 140 may rotate about a central axis 155. Optionally, the carrier head 140 may oscillate in a lateral direction, for example, on a slider on the carousel 150 or the track or oscillate due to rotary oscillation of the carousel 150. During an operation, the platen 120 may rotate about a central axis 125 thereof, and the carrier head 140 may rotate the central axis 155 thereof and be translated across a top surface of the polishing pad 110 in a lateral direction.

Although only one carrier head 140 is illustrated in FIG. 1, at least two carrier heads for maintaining additional substrates may be provided to efficiently use a surface area of the polishing pad 110.

The polishing apparatus 100 may also include a control system configured to control rotation of the platen 120. The control system may include a controller 190 (e.g., a general-use programmable digital computer), an output device 192 (e.g., a monitor), and an input device 194 (e.g., a keyboard).

Although FIG. 1 illustrates an example in which the control system is connected only to the motor 121, the control system may be also connected to the carrier head 140 and control a pressure or rotation speed of the carrier head 140. Furthermore, the control system may be connected to the slurry port 130 and control the supplying of slurry.

Example embodiments of the inventive concepts provide a slurry composition for a CMP process, which may be used for the polishing apparatus 100.

The slurry composition for the CMP process may include ceramic particles having surfaces to which a surface-modifying functional group is bonded, and a dispersion medium.

Figure 2:
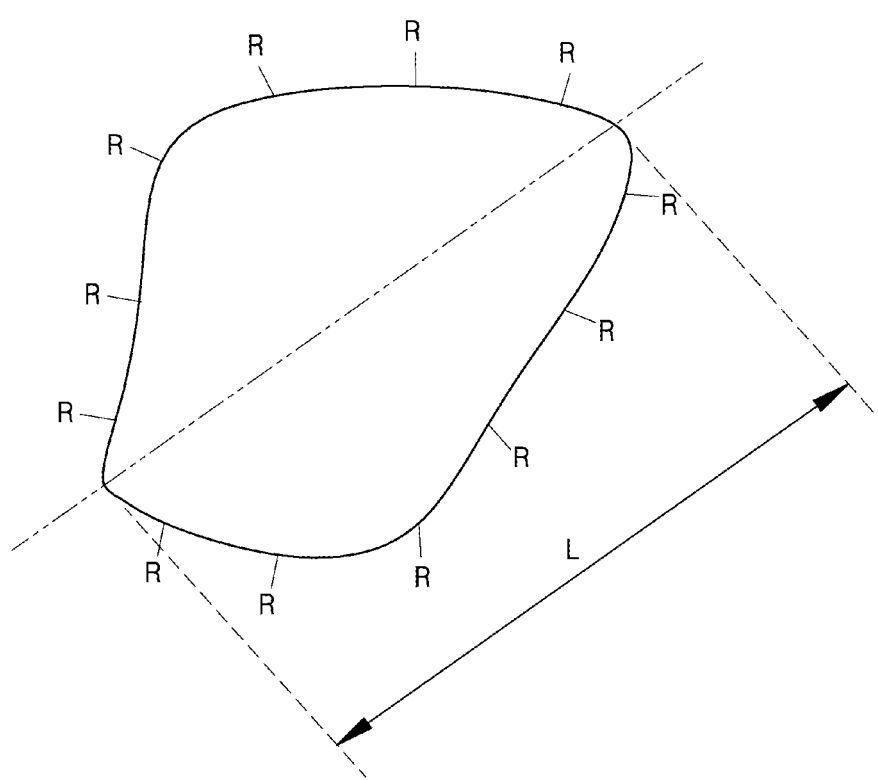
FIG. 2 is a schematic diagram of ceria particles having surfaces including nitrate functional groups.

FIG. 2 is a schematic diagram of ceramic particles 20 having surfaces with surface-modifying functional groups.

Referring to FIG. 2, the ceramic particles 20 may have irregular shapes. In this case, a size (or particle diameter) of the ceramic particles 20 may be defined as a maximum value L between two arbitrary points on the surface of the ceramic particle 20.

The ceramic particles 20 may include an oxide, a nitride, or an oxynitride of a metal or a semimetal, but a material included in the ceramic particles 20 is not specifically limited. In particular, the metal or semimetal may include at least one selected from the group consisting of silicon (Si), aluminum (Al), cerium (Ce), and titanium (Ti). In particular, the ceramic particles 20 may be ceria particles.

The ceramic particles 20 may have an average particle diameter of about 1 nm to about 150 nm. Alternatively, the ceramic particles 20 may have an average particle diameter of about 1 nm to about 100 nm. Alternatively, the ceramic particles 20 may have an average particle diameter of about 1 nm to about 80 nm. Alternatively, the ceramic particles 20 may have an average particle diameter of about 1 nm to about 60 nm. Alternatively, the ceramic particles 20 may have an average particle diameter of about 5 nm to about 100 nm. Alternatively, the ceramic particles 20 may have an average particle diameter of about 20 nm to about 80 nm.

The surface-modifying functional group (—R) may be bonded to the surfaces of the ceramic particles 20. The surface-modifying functional group (—R) may include at least one selected from the group consisting of a nitrate group ($NO_3$), a carbonate group ($CO_3$), a sulfate group ($SO_4$), an oxalate group ($C_2O_4$), and a methane sulfonate group ($CH_3SO_3$). Even if the surface-modifying functional groups (—R) are bonded to the surfaces of the ceramic particles 20, hydroxyl groups (—OH) may be further bonded to the surfaces of the ceramic particles depending on the ambient environment.

Performing the analysis method (e.g., Fourier-transform infrared spectroscopy (FT-IR)) may confirm whether the surface-modifying functional groups (—R) are bonded to the surfaces of the ceramic particles 20. For example, when nitrate groups $NO_3$ are bonded to the surfaces of the ceramic particles 20, a peak in an FT-IR spectrum may be at a position ranging from about 1250 cm−1 to about 1400 cm−1 or at a position ranging from about 1500 cm−1 to about 1700 cm−1 in an FT-IR spectrum.

Figure 3:
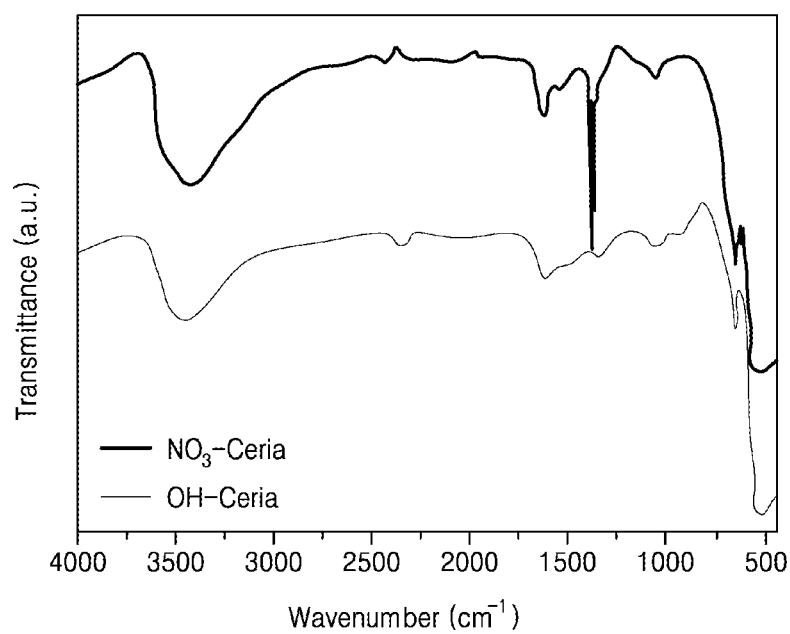
FIG. 3 is a graph showing results obtained by performing Fourier-transform infrared spectroscopy (FT-IR) analysis on an example prepared by modifying surfaces of ceria particles with nitrate groups and an example prepared without modifying surfaces of ceria particles.

FIG. 3 is a graph showing results obtained by performing FT-IR analysis on an example prepared by modifying surfaces of ceria particles with nitrate groups and an example prepared without modifying surfaces of ceria particles.

Referring to FIG. 3, a peak was in the range of about 1250 cm−1 to about 1400 cm−1.

The nitrate group may be derived from, for example, nitric acid. The carbonate group may be derived from, for example, carbonic acid. The sulfate group may be derived from, for example, sulfuric acid. The oxalate group may be derived from, for example, oxalic acid. The methanesulfonate group may be derived from, for example, methanesulfonic acid. However, example embodiments of the inventive concepts are not limited thereto.

The ceramic particles are generally terminated with hydroxyl groups (—OH) before the surfaces of the ceramic particles are modified. When the hydroxyl groups are replaced by the above-described surface-modifying functional groups, isoelectric point (IEP) characteristics may be changed. More specifically, when a zeta potential curve with regard to a pH value is obtained via experiments, a zeta potential curve obtained after the surfaces of the ceramic particles are modified may be different from a zeta potential curve obtained before the surfaces of the ceramic particles are modified. That is, due to a modification process of replacing the hydroxyl groups with the surface-modifying functional groups, a pH range within which a zeta potential value of a zeta potential curve or an electric sonic amplitude (ESA) value is larger than 0 may be extended up to a relatively high pH value. As a result, a zeta potential value of the ceramic particles having the modified surfaces may be larger than 0 in at least a pH range of 0 to 9.5.

Figure 4:
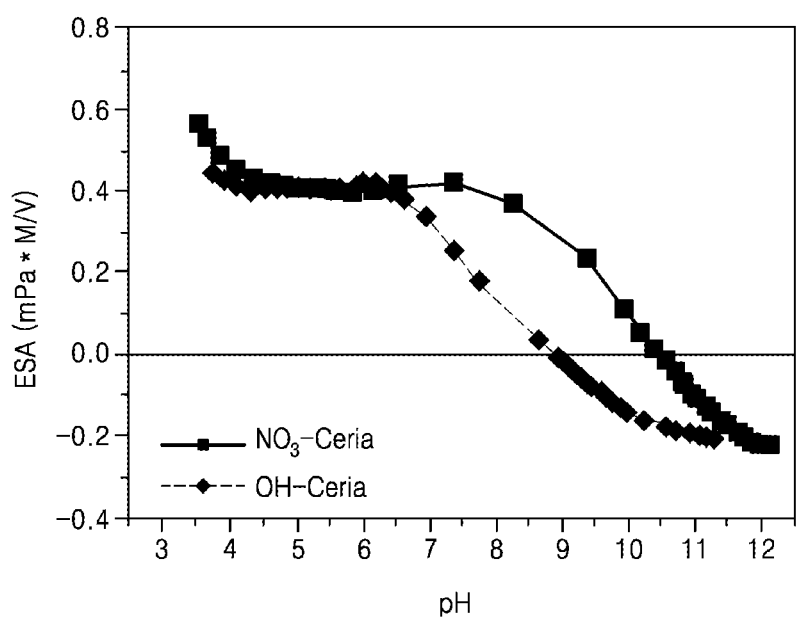
FIG. 4 is a graph showing results obtained by analyzing isoelectric point (IEP) characteristics before and after surfaces of ceria particles are modified by using a nitrate functional group.

FIG. 4 is a graph showing results obtained by analyzing IEP characteristics before and after surfaces of ceria particles were modified by using nitrate functional groups.

Referring to FIG. 4, a pH range within which a zeta potential value was larger than 0 was about 8.8 or less before the surfaces of the ceramic particles were modified. However, after the surfaces of the ceramic particles were modified with the nitrate groups, a pH range within which the zeta potential value is larger than 0 may be extended to about 10.5 or less. In particular, after the surfaces of the ceria particles are modified, the ceramic particles may have an ESA of more than about 0.2 mPa·m/V while a pH value is at least 7 to 9.

The slurry composition for the CMP process may further include a dispersion medium for dispersing the ceramic particles.

The dispersion medium may be an arbitrary liquid capable of substantially uniformly dispersing the ceramic particles, but is not specifically limited. The dispersion medium may be an aqueous solvent or an organic solvent. More specifically, the dispersion medium may be an aqueous solvent, e.g., water, deionized water (DIW), and ultrapure water. Alternatively, the dispersion medium may be an organic solvent, e.g., aliphatic alcohols having 1 to 15 carbon atoms and ethers having 2 to 20 carbon atoms.

The slurry composition for the CMP process may contain about 0.1 to 15 parts by weight of the ceramic particles based on 100 parts by weight of the dispersion medium. Alternatively, the slurry composition may contain about 0.5 to 10 parts by weight of the ceramic particles based on 100 parts by weight of the dispersion medium. Alternatively, the slurry composition may contain about 1 to 5 parts by weight based on 100 parts by weight of the dispersion medium.

The slurry composition for the CMP process may further include a pH control agent to control a pH value of the slurry composition for the CMP process. Also, the slurry composition for the CMP process may have a pH value of about 1 to about 9.

The pH control agent may be an acidic solution, e.g., sulphuric acid, phosphoric acid, hydrochloric acid, nitric acid, carboxylic acid, maleic acid, malonic acid, citric acid, oxalic acid, and tartaric acid, and/or an alkali solution, e.g., calcium hydroxide, potassium hydroxide, ammonium hydroxide, sodium hydroxide, magnesium hydroxide, triethylamine, tetra methyl ammonium hydroxide (TMAH), and ammonia, but is not limited thereto. The pH control agent may be contained in the slurry composition at such a content that a pH value of the slurry composition ranges from 1 to 9, but the pH control agent is not specifically limited.

The ceramic particles may have a smaller average particle diameter than an average particle diameter of ceramic particles used for a slurry composition of the related art. More specifically, the ceramic particles may have an average particle diameter about 30% to about 50% smaller than an average particle diameter of the ceramic particles of the related art. When a CMP process is performed by using ceramic particles having a relatively small average particle diameter, a polishing rate may be reduced under the same polishing conditions. Although a method of adding a polishing accelerator is known to compensate for the reduced polishing rate, the polishing accelerator may degrade dispersion stability of slurry particles and need to be changed according to the material of a layer to be polished. Thus, the polishing accelerator may not be a desirable solution for accelerating the reduced polishing rate.

However, surface-modifying functional groups were bonded to surfaces of ceramic particles according to example embodiments of the inventive concepts, and it was revealed that a polishing rate increases due to a chemical action of the surface-modifying functional groups. Thus, by controlling a concentration of the surface-modifying functional groups bonded to the surfaces of the ceramic particles, the same polishing rate may be ensured by using ceramic particles having a smaller average particle diameter without using a polishing accelerator.

A common polishing accelerator for the CMP process may include an anionic oligomer, an anionic polymer, a hydroxyl acid, an amino acid, or salts of the hydroxyl acids or the amino acids. For example, the anionic oligomer and the anionic polymer may include at least one of poly(acrylic acid), poly(methacrylic acid), copolymeric acids thereof, or salts thereof. Also, the hydroxyl acid may include at least one of hydroxybenzoic acid and ascorbic acid. Also, non-limiting examples of the amino acid may include picolinic acid, serine, proline, arginine, asparagine, aspartic acid, cysteine, glutamine, glutamic acid, glycine, histidine, lysine, phenylalanine, tyrosine, valine, tryptophan, betaine, pyroglutamic acid, amino butyric acid, pyridine carboxylic acid, polyethyleneglycol amino ether acetic acid, and isoleucine.

Additional examples of the polishing accelerator may include quinone-based compounds, e.g., 3-hydroxy-4-methyl-phenol anion, 3-hydroxy-4-hydroxymethyl-phenol anion, 4-methyl-benzene-1,3-diol, kojic acid, maltol propionate, and maltol isobutyrate. Non-limiting examples of the quinone-based compound may include at least one selected from the group consisting of dienone, diol, and dienol anions including alkylbenzene diols and hydroxyl and alkyl groups, dienone, diol, and dienol anions including phenol anions and alkyl groups linked to oxo groups, and dienone, diol, and dienol anions including hydroxyalkyl and benzene rings.

Specifically, non-limiting examples of the quinone-based compound may further include at least one selected from the group consisting of 4-alkyl-benzene-1,3-diol, hydroxy-4-alkyl-cyclohexa-2,5-dienone, 6-alkyl-3-oxo-cyclohexa-1,4-dienol anion, 3-hydroxy-6-alkyl-cyclohexa-2,4-dienone, 4-alkyl-3-oxo-cyclohexa-1,5-dienol anion, 3-hydroxy-4-alkyl-phenol anion, 5-hydroxy-2-alkyl-phenol anion, 3-hydroxy-4-alkyl-phenol anion, 5-hydroxy-2-hydroxyalkyl-phenol anion, 3-hydroxy-4-hydroxyalkyl-phenol anion, 3-hydroxy-4-hydroxyalkyl-cyclohexa-2,5-dienone, 6-hydroxyalkyl-3-oxo-cyclohexa-1,4-dienol anion, 3-hydroxy-6-hydroxyalkyl-cyclohexa-2,4-dienone, 4-hydroxyalkyl-3-oxo-cyclohexa-1,5-dienol anion, or 4-hydroxyalkyl-benzene-1,3-diol.

Other additional examples of the polishing accelerator may include ammonium hydrogen phosphate, ammonium dihydrogen phosphate, bis(2-ethylhexyl)phosphate, 2-aminoethyl dihydrogen phosphate, 4-chlorobenzenediazonium hexafluorophosphate, nitrobenzenediazonium hexafluorophosphate, ammonium hexafluorophosphate, bis (2,4-dichlorophenyl) chlorophosphate, bis(2-ethylhexyl) hydrogenphosphate, bis(2-ethylhexyl)phosphite, calcium fluorophosphate, diethyl chlorophosphate, diethyl chlorothiophosphate, potassium hexafluorophosphate, pyrophosphoric acid, tetrabutylammonium hexafluorophosphate, and tetraethylammonium hexafluorophosphate.

The slurry composition for the CMP process according to example embodiments may not include the above-described polishing accelerator.

The slurry composition for the CMP process, which is typically used to polish a metal material layer, may include an oxidizer. Non-limiting examples of the oxidizer may include organic peroxides (e.g., hydrogen peroxide ($H_2O_2$)), peracetic acid, perbenzoic acid, and tert-butyl hydroperoxide; permanganate compounds (e.g., potassium permanganate); dichromate compounds (e.g., potassium dichromate); halogen acid compounds (e.g., potassium iodate); nitrate compounds (e.g., nitric acid and/or iron nitrate); perhalogen acid compounds (e.g., perchloric acid); persulfates (e.g., sodium persulfate, potassium persulfate, and ammonium persulfate); percarbonates (e.g., sodium percarbonate and potassium percarbonate); carbamide peroxide; and heteropoly acid.

It was discovered that a metal could be polished at a sufficient rate by using a slurry composition for a CMP process according to example embodiments of the inventive concepts without using an oxidizer.

Thus, a slurry composition for a CMP process according to some example embodiments may not include the above-described oxidizer.

The slurry composition for the CMP process may further include a dispersant to ensure dispersion stability of ceramic particles. The dispersant may include a nonionic polymer or a cationic organic compound. For example, the dispersant may include at least one selected from the group consisting of ethylene oxide, ethylene glycol, glycol distearate, glycol monostearate, glycol ethers, alkyl amine-containing alcohols, sorbitol-containing compounds, vinyl pyrrolidone, celluloses, and ethoxylate-based compounds. Specifically, the dispersant may include at least one selected from the group consisting of diethylene glycol hexadecyl ether, decaethylene glycol hexadecyl ether, diethylene glycol octadecyl ether, eicosaethylene glycol octadecyl ether, diethylene glycol oleyl ether, decaethylene glycol oleyl ether, decaethylene glycol octadecyl ether, nonylphenol polyethylene glycol ether, ethylenediamine tetrakis(ethoxylate-block-propoxylate) tetrol, ethylenediamine tetrakis(propoxylate-block-ethoxylate) tetrol, polyethylene-block-poly(ethylene glycol), polyoxyethylene isooctylphenyl ether, polyoxyethylene octylphenyl ether, polyoxyethylene tridecyl ether, polyoxyethylene sorbitan tetraoleate, polyoxyethylene sorbitol hexaoleate, polyethylene glycol sorbitan monolaurate, polyoxyethylenesorbitan monolaurate, sorbitan monopalmitate, FS-300 nonionic fluorosurfactant, FSN nonionic fluorosurfactant, FSO nonionic ethoxylated fluoro surfactant, vinyl pyrrolidone, celluloses, 2,4,7,9-Tetramethyl-5-decyne-4,7-diol ethoxylate, 8-methyl-1-nonanol propoxylate-block-ethoxylate, allyl alcohol 1,2-butoxylate-block-ethoxylate, polyoxyethylene branched nonylcyclohexyl ether, or polyoxyethylene isooctylcyclohexyl ether. For example, the dispersant may be mixed in an amount of about 0.1% by weight to about 1% by weight based on a total weight of the slurry composition for the CMP process.

The slurry composition for the CMP process may further include a surfactant as needed. The surfactant may be any one of a nonionic surfactant, a cationic surfactant, an anionic surfactant, and an amphoteric surfactant.

The nonionic surfactant may be polyoxyethylene alkylethers (e.g., polyoxyethylene laurylether and polyoxyethylene stearylether); polyoxyethylene alkylphenylethers (e.g., polyoxyethylene octylphenylether and polyoxyethylene nonyl phenylether); sorbitan monolaurate, sorbitan higher fatty acid esters (e.g., sorbitan monostearate and sorbitan trioleate); polyoxyethylene sorbitan higher fatty acid esters (e.g., polyoxyethylene sorbitan monolaurate); polyoxyethylene higher fatty acid esters (e.g., polyoxyethylene monolaurate and polyoxyethylene monostearate); glycerine higher fatty acid esters (e.g., oleic acid monoglyceride and stearic acid monoglyceride); polyoxyalkylenes (e.g., polyoxyethylene, polyoxypropylene, and polyoxybutylene), and block copolymers thereof.

The cationic surfactant may be alkyl trimethyl ammonium chloride, dialkyl dimethyl ammonium chloride, benzalkonium chloride, or alkyl dimethyl ammonium ethosulfate.

The anionic surfactant may be carboxylic acid salts (e.g., lauric acid sodium, oleic acid sodium, N-acyl-N-methylglycine sodium salt, and polyoxyethylene laurylether carboxylic acid sodium), sulfonates (e.g., dodecylbenzene sulfonic acid sodium), sulfonic acids (e.g., dialkyl sulfosuccinate ester salt and dimethyl-5-sulfoisophthalate sodium), sulfate ester salts (e.g., sodium lauryl sulphate (SLS), sodium lauryl polyoxyethylene ether sulphate, and polyoxyethylene nonylphenyl ether sodium sulfate), and phosphate ester salts (e.g., polyoxyethylene lauryl sodium phosphate and polyoxyethylene nonylphenyl ether sodium phosphate).

The amphoteric surfactant may be a carboxybetaine surfactant, aminocarboxylic acid, imedazolinium betaine, lecithin, or alkylamineoxide.

The surfactant may be mixed in an amount of about 0.001% by weight to about 0.5% by weight based on a total weight of the slurry composition for the CMP process.

The slurry composition for the CMP process may further include a polishing inhibitor as needed.

Non-limiting examples of the polishing inhibitor may be a nitrogen-containing compound (e.g., amine) and a low-molecular-weight heterocyclic compound (e.g., benzotriazole, 1,2,3-triazole, and 1,2,4-triazole) containing a nitrogen.

The polishing inhibitor may be mixed in an amount of about 0.1% by weight to about 1% by weight based on a total weight of the slurry composition for the CMP process.

The slurry composition for the CMP process may further include a levelling agent for reducing irregularities of a polished surface as needed.

Non-limiting examples of the leveling agent may include ammonium chloride, ammonium lauryl sulfate (ALS), polyethyleneglycol, polyoxyethylene alkyl ether sulfate (AES) triethylamine, polyvinylpyrrolidone (PVP), and polyacrolein.

The leveling agent may be mixed in an amount of about 0.1% by weight to about 1% by weight based on a total weight of the slurry composition for the CMP process.

A polishing rate of the slurry composition for the CMP process may be affected by a material included in the slurry composition, a kind of a material layer to be polished, pH and a pressure applied to a head during a polishing process, etc.

In some example embodiments, when a silicon oxide ($SiO_2$) layer is polished by using the slurry composition for the CMP process according to example embodiments while applying a pressure of about 4 psi at a pH value of about 7.0, a polishing rate of about 3000 Å/min to about 6000 Å/min may be obtained.

In some example embodiments, when a silicon oxide layer is polished by using the slurry composition for the CMP process according to example embodiments while applying a pressure of about 4 psi at a pH value of about 2.0, a polishing rate of about 400 Å/min to about 1000 Å/min may be obtained.

In some example embodiments, when a tungsten (W) layer or a copper (Cu) layer is polished by using the slurry composition for the CMP process according to example embodiments while applying a pressure of about 4 psi at a pH value of about 2.0, a polishing rate of about 400 Å/min to about 1000 Å/min may be obtained.

In some example embodiments, when a silicon nitride (SiNX) layer is polished by using the slurry composition for the CMP process according to example embodiments while applying a pressure of about 4 psi at a pH value of about 2.0, a polishing rate of about 50 Å/min to about 400 Å/min may be obtained.

Hereinafter, a method of manufacturing the slurry composition for the CMP process will be described.

Figure 5:
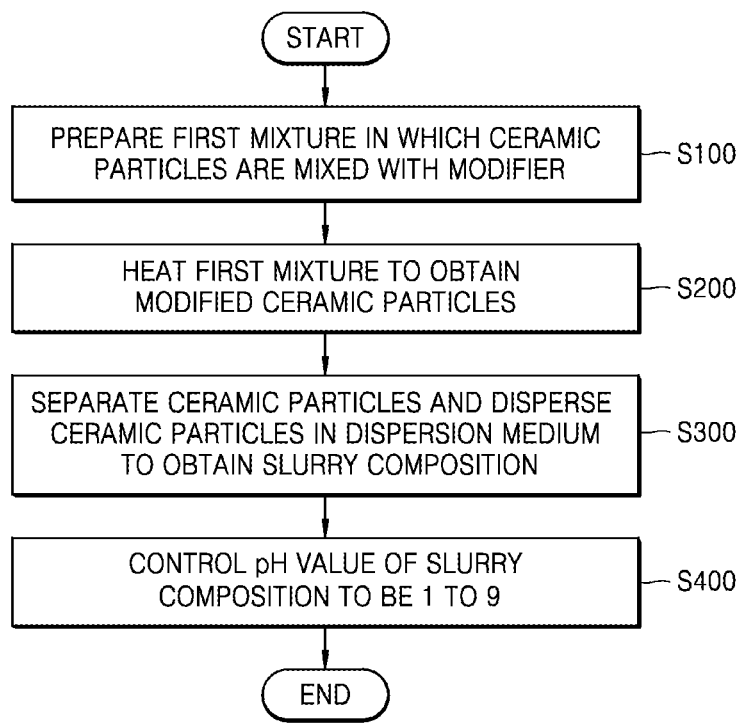
FIG. 5 is a flowchart of a method of manufacturing a slurry composition for the CMP process according to example embodiments of the inventive concepts.

FIG. 5 is a flowchart of a method of manufacturing a slurry composition for a CMP process, according to example embodiments of the inventive concepts.

Referring to FIG. 5, a first mixture may be prepared by mixing ceramic particles with a modifier (S100).

The modifier may be a chemical agent capable of modifying surfaces of the ceramic particles. The modifier may include at least one selected from the group consisting of nitric acid, sulfuric acid, carbonic acid, oxalic acid, and methanesulfonic acid. Each of the nitric acid, the sulfuric acid, the carbonic acid, the oxalic acid, and the methanesulfonic acid may have a concentration appropriate for modifying the ceramic particles without any particular limitation. In particular, the modifier may be nitric acid.

The ceramic particles may include at least one selected from the group consisting of ceria, silica, alumina, and titania and have an average particle diameter of about 1 nm to about 150 nm. Because the concept of a particle diameter is described above with reference to FIG. 2, additional descriptions thereof are omitted here. In particular, the ceramic particles may be ceria.

The ceria particles may be obtained by wet oxidizing cerium hydroxide, which is obtained by mixing a cerium salt solution with an alkali solution, and precipitating the oxidized cerium hydroxide.

Thereafter, the first mixture may be heated to obtain modified ceramic particles (S200). The heating of the first mixture may be performed at a temperature of about 60° C. to about 150° C. Also, the heating of the first mixture may be performed for about 10 minutes to about 8 hours. Furthermore, the first mixture may be stirred during the heating of the first mixture.

Next, the ceramic particles having the modified surfaces may be separated from the modifier and dispersed in a dispersion medium to obtain a slurry composition (S300).

A method of separating the ceramic particles from the modifier may be performed by using, for example, a vacuum filtration process, but is not limited thereto.

The ceramic particles may be mixed in an amount of about 0.1 to 15 parts by weight based on 100 parts by weight of the dispersion medium. Alternatively, the ceramic particles may be mixed in an amount of about 0.5 to 10 parts by weight based on 100 parts by weight of dispersion medium 100. Alternatively, the ceramic particles may be mixed in an amount of about 1 to 5 parts by weight based on 100 parts by weight of the dispersion medium.

The dispersion medium may be an arbitrary liquid capable of substantially uniformly dispersing the ceramic particles, but is not specifically limited. The dispersion medium may be an aqueous solvent or an organic solvent. More specifically, the dispersion medium may be an aqueous solvent, e.g., water, DIW, or ultrapure water. Alternatively, the dispersion medium may be an organic solvent, e.g., aliphatic alcohols having 1 to 15 carbon atoms and ethers having 2 to 20 carbon atoms.

Optionally, the method of manufacturing the slurry composition for the CMP process may further include controlling a pH value of the slurry composition (S400).

To control a pH value of the slurry composition, the pH control agent may be added to the slurry composition. The pH control agent may be an acidic solution, e.g., sulphuric acid, phosphoric acid, hydrochloric acid, nitric acid, carboxylic acid, maleic acid, malonic acid, citric acid, oxalic acid, and tartaric acid, and/or an alkali solution, e.g., calcium hydroxide, potassium hydroxide, ammonium hydroxide, sodium hydroxide, magnesium hydroxide, triethylamine, TMAH, and ammonia, but is not limited thereto.

The pH control agent may be added such that a pH value of the slurry composition ranges from 1 to 9.

Hereinafter, a polishing method using a slurry composition for the CMP process according to example embodiments of the inventive concepts will be described.

Figure 6:
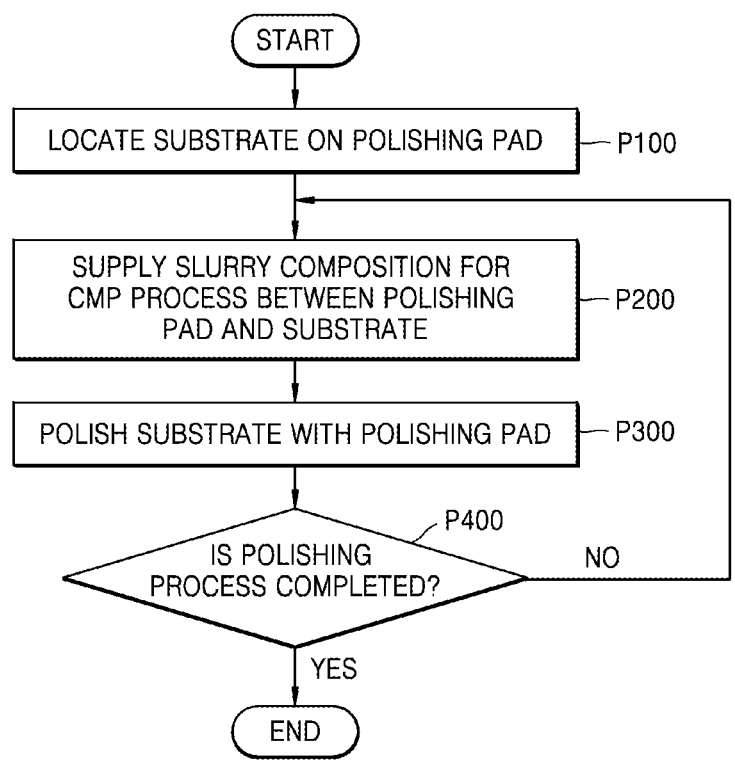
FIG. 6 is a flowchart of a polishing method according to example embodiments of the inventive concepts.

FIG. 6 is a flowchart of a polishing method according to example embodiments of the inventive concepts.

Referring to FIGS. 1 and 6, a substrate 10 may be located on a polishing pad 110 (P100). The substrate 10 may be a semiconductor wafer or a transmissive substrate, e.g., a glass substrate or a quartz substrate.

The substrate 10 may be located between the polishing pad 110 and the carrier head 140. The carrier head 140 may serve to apply pressure to the substrate 10 and control motion of the substrate 10.

In this case, a surface of the substrate 10 on which a material layer to be polished is located may face toward the polishing pad 110.

Thereafter, a slurry composition for a CMP process (refer to 132 in FIG. 1) may be supplied between the polishing pad 110 and the substrate 10 (P200).

The slurry composition for the CMP process may be the above-described slurry composition.

Thereafter, the substrate may be polished by the polishing pad 110 (P300).

In particular, frictional force between the polishing pad 110 and the substrate 10 may be generated to an appropriate level by applying pressure to the substrate 10 by using the carrier head 140. For example, the frictional force may be generated by applying a pressure of about 1 psi to about 10 psi or a pressure of about 2 psi to about 6 psi to the substrate 10.

To polish the substrate 10 with the polishing pad 110, not only the carrier head 140 but also the polishing pad 110 may rotate. Although FIG. 1 illustrates an example in which the carrier head 140 and the polishing pad 110 rotate in the same direction (a counterclockwise direction), the carrier head 140 and the polishing pad 110 may rotate in opposite directions.

The slurry composition may be provided to the center of the rotating polishing pad 110 and transferred to the surface of the substrate 10 due to centrifugal force. In some example embodiments, the slurry composition may be supplied to an upstream side of the substrate 10 based on a rotary direction of the polishing pad 110 and transferred to the surface of the substrate 10 due to rotation of the polishing pad 110.

It may be determined whether the substrate 10 has been polished until the substrate 10 is polished to a desired thickness or until a desired material layer is exposed (P400). When a signal indicating that the substrate 10 is polished to the desired thickness or the desired material layer is exposed is received, it may be determined that a polishing process is completed, and the polishing process may be ended. Otherwise, it may be determined that the polishing process is not completed, and the above-described polishing processes may be repeated.

In the CMP method according to example embodiments, when a silicon oxide ($SiO_2$) layer is polished while applying a pressure of about 4 psi and controlling a pH value of a slurry composition for a CMP process to be 7.0, a polishing rate of about 3000 Å/min to about 6000 Å/min may be obtained.

In the CMP method according to example embodiments, when a silicon oxide layer is polished while applying a pressure of about 4 psi and controlling a pH value of a slurry composition for a CMP process to be 2.0, a polishing rate of about 400 Å/min to about 1000 Å/min may be obtained.

In the CMP method according to example embodiments, when a tungsten (W) layer or a copper (Cu) layer is polished while applying a pressure of about 4 psi and controlling a slurry composition for a CMP process to be 2.0, a polishing rate of about 400 Å/min to about 1000 Å/min may be obtained.

In the CMP method according to example embodiments, when a silicon nitride ($SiN_X$) layer is polished while applying a pressure of about 4 psi and controlling a slurry composition for a CMP process to be 2.0, a polishing rate of about 50 Å/min to about 400 Å/min may be obtained.

Hereinafter, experimental examples and comparative examples applied to layers having various film qualities obtained by modifying surfaces of ceria will be described.

[Preparation of Ceria Particles]

A solution in which $Ce(OH)_3$ was precipitated was obtained by mixing a cerium salt solution with an ammonium hydroxide solution. Next, potassium permanganate ($KMnO_4$) was added as a wet oxidizer and stirred to obtain a $CeO_2$ precipitation. Thereafter, only the $CeO_2$ precipitation was separated from the solution, washed in water, and dried to obtain ceria particles.

An average particle diameter of the ceria particles was measured to be about 65 nm, and a broad peak was in the range of about 3000 cm−1 to about 3500 cm−1 via FT-IR analysis. Thus, hydroxyl groups (—OH) were formed on surfaces of the ceria particles (refer to FIG. 3).

Comparative Example 1

To obtain a slurry composition, some of ceria particles were taken and put into DIW to form a slurry phase. In this case, ceria particles were contained in an amount of 3 parts by weight based on 100 parts by weight of DIW. Also, a pH value of the slurry composition was controlled to be 2.0 by using HCl and NaOH as a pH control agent.

Comparative Example 2

A slurry composition was prepared in the same manner as in Comparative example 1 except that a pH value of the slurry composition is controlled to be 7.0 by using a pH control agent.

Experimental Example 1

Some of the prepared ceria particles were taken and put into a 3M nitric acid solution 3M and heat-treated at a temperature of about 70° C. for about 4 hours.

By performing FT-IR analysis on the ceria particles having modified surfaces, a relatively sharp peak was in the range of about 1250 cm−1 to about 1400 cm−1. Thus, nitrate groups were formed on the modified surfaces of the ceria particles (refer to FIG. 3).

Thereafter, the ceria particles were separated, washed in water, and put into DIW to form a slurry phase. In this case, ceria particles were contained in an amount of 3 parts by weight based on 100 parts by weight of DIW. Also, a pH value of slurry was controlled to be about 2.0 by using a pH control agent.

Experimental Example 2

A slurry composition was prepared in the same manner as in Experimental example 1 except that a pH value of the slurry composition was controlled to be 7.0 by using a pH control agent.

A plurality of silicon substrates on which a silicon oxide (SiO2) layer was formed were prepared, and polishing experiments were respectively conducted on the silicon substrates using slurry compositions prepared according to Experimental example 1, Experimental example 2, Comparative example 1, and Comparative example 2. CETR CP-4 was used as a CMP tester, and an IC1010 polishing pad (a product of Dow) was adopted. A pressure of 4 psi was applied to the substrates, and the substrates and the polishing pad were rotated at rotation rates of 70 rpm and 69 rpm, respectively. Also, a flow rate of slurry was constantly adjusted to 100 ml/min during a polishing process.

The substrates were polished by using respective samples for 2 minutes. Variations in thicknesses of the substrates between before and after the polishing process were measured, and polishing rates were calculated and arranged in Table 1.

TABLE 1

| pH = 2.0 | Comparative example 1 295 Å/min | Experimental example 1 599 Å/min | 103% increase |
| pH = 7.0 | Comparative example 2 2740 Å/min | Experimental example 2 3690 Å/min | 35% increase |

As can be seen from Table 1, when a pH value was fixed to 2.0 and Comparative example 1 was compared with Experimental example 1, a polishing rate obtained after a surface modification process increased about 103% more than a polishing rate obtained before the surface modification process.

In addition, when a pH value was fixed to 7.0 and Comparative example 2 was compared with Experimental example 2, a polishing rate obtained after a surface modification process increased about 35% more than a polishing rate obtained before the surface modification process.

A difference in polishing rate is dependent on whether or not surfaces of ceria particles having substantially the same average particle diameter (e.g., about 65 nm) were modified. Also, from the above-described analysis, a reduction in the polishing rate caused by the miniaturization of polishing particles could be sufficiently counteracted by the modification of the surfaces of the ceria particles.

Furthermore, to observe characteristics of material layers other than a silicon oxide layer, metal layers (e.g., a tungsten layer and a copper layer) and a silicon nitride layer were tested by using the slurry compositions according to Experimental example 1 and Comparative example 1 under the same conditions as in Table 1, and test results were arranged as shown in Table 2.

TABLE 2

| Tungsten | Comparative example 1 167 Å/min | Experimental example 1 567 Å/min | 239% increase |
| Copper | Comparative example 1 140 Å/min | Experimental example 1 500 Å/min | 257% increase |
| SiNx | Comparative example 1 39 Å/min | Experimental example 1 80 Å/min | 105% increase |

From Table 2, polishing rates of both the metal layers (e.g., the tungsten and copper layers) and the silicon nitride layer were increased.

Accordingly, the slurry compositions according to example embodiments could be applied not only to the silicon oxide layer but also to the metal layers (e.g., the tungsten and copper layers) and the silicon nitride layer.

In particular, when a CMP process is performed on the metal layers, the CMP process may be typically performed by adding an oxidizer (e.g., hydrogen peroxide) in an acidic atmosphere. However, as can be seen in the example in which the tungsten layer and the copper layer were polished by using the slurry composition according to Experimental example 1, the slurry composition according to example embodiments may polish the metal layer without an oxidizer at a considerably high polishing rate. Accordingly, by use of a slurry composition for a CMP process according to example embodiments of the inventive concepts, an environmentally friendly manufacturing process may be enabled at a relatively low cost by reducing a used amount of oxidizer.

Because the slurry composition for the CMP process according to example embodiments includes polishing particles having a small size without dropping a polishing rate, semiconductor products may be rapidly manufactured in relatively high yield. Also, the slurry composition for the CMP process may be widely used for a metal material layer or a nitride layer and generally used.

In addition, because the polishing of a metal layer does not involve the addition of an oxidizer, ensuring an environmentally friendly process having improved economic efficiency may be easier.

Hereinafter, a method of manufacturing a semiconductor device by using the above-described CMP process will be described.

FIGS. 7A to 7M are side cross-sectional views of a method of manufacturing a semiconductor device 300 according to example embodiments of the inventive concepts.

Figure 7A:
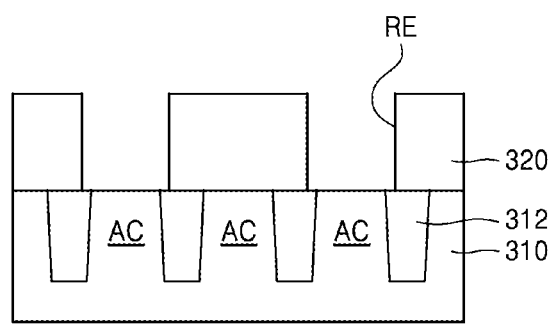
FIGS. 7A to 7M are side cross-sectional views of a method of manufacturing a semiconductor device according to example embodiments of the inventive concepts.

Referring to FIG. 7A, an interlayer insulating layer 320 may be formed on a substrate 310 including a plurality of active regions AC and patterned to expose at least portions of the plurality of active regions AC. The interlayer insulating layer 320 may include recess portions RE exposing the active regions AC. The recess portions RE may be contact holes or trenches. Although some example embodiments illustrate a case in which the recess portions RE are the contact holes, it will be understood that example embodiments of the inventive concepts are applicable likewise to a case in which the recess portions RE are trenches.

The substrate 310 may include a semiconductor (e.g., silicon (Si) or germanium (Ge)) or a compound semiconductor (e.g., silicon germanium (SiGe), silicon carbide (SiC), gallium arsenide (GaAs), indium arsenide (InAs), or indium phosphide (InP)). In some example embodiments, the substrate 310 may include at least one of a Group III-V material and a Group IV material. The Group III-V material may be a binary compound, a ternary compound, or a quaternary compound including at least one Group III atom and at least one Group V atom. The Group III-V material may be a compound including a Group III atom (e.g., at least one atom of In, Ga, and Al) and a Group V atom (e.g., at least one atom of arsenide (As), phosphorus (P), and antimony (Sb)). For example, the Group III-V material may be selected from InP, $In_zGa_{1-z}As$ ($0 \leq z \leq 1$), and $Al_zGa_{1-z}As$ ($0 \leq z \leq 1$). The binary compound may be, for example, any one of InP, GaAs, InAs, InSb, and GaSb. The ternary compound may be any one of InGaP, InGaAs, AlInAs, InGaSb, GaAsSb, and GaAsP. The Group IV material may be silicon or germanium. However, the Group III-V material and the Group IV material that may be used for the semiconductor device 300 according to example embodiments are not limited to the above-described examples. In another example, the substrate 310 may have a silicon-on-insulator (SOI) structure. The substrate 310 may include a conductive region, for example, a doped well or a doped structure.

The plurality of active regions AC may be defined by a plurality of device isolation regions 312 formed in the substrate 310. The device isolation regions 312 may include a silicon oxide layer, a silicon nitride layer, a silicon oxynitride layer, or a combination thereof.

The interlayer insulating layer 320 may include a silicon oxide layer.

Figure 7B:
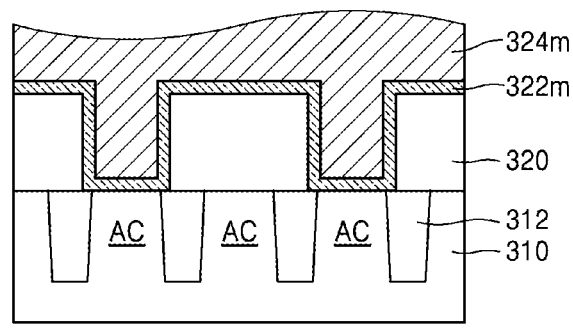
Figure 7B:
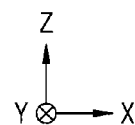

Referring to FIG. 7B, a barrier metal material layer 322m may be formed in the recess portion RE and on the entire top surface of the interlayer insulating layer 320. The barrier metal material layer 322m may be formed by using an atomic layer deposition (ALD) process, a chemical vapor deposition (CVD) process, or a physical vapor deposition (PVD) process. The barrier metal material layer 322m may include, for example, titanium (Ti) and/or titanium nitride (TiN).

Also, a conductive material layer 324m may be formed on the entire top surface of the barrier metal material layer 322m. The conductive material layer 324m may be formed of tungsten (W) by using a CVD process.

Figure 7C:
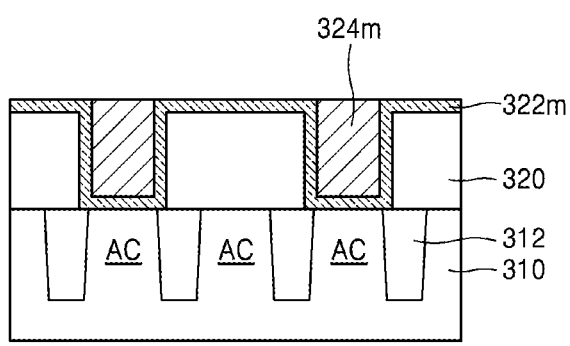

Referring to FIG. 7C, a CMP process may be performed on the conductive material layer 324m so that the conductive material layer 324m may be defined within the recess portion RE. To this end, a slurry composition for a CMP process, which contains ceramic particles of which surfaces are modified with specific functional groups, may be used.

In this case, the CMP process may be performed by using the barrier metal material layer 322m as a polishing stop layer.

In addition, when a CMP process is performed on a metal layer, the CMP process may be typically performed in an acidic atmosphere by adding an oxidizer (e.g., hydrogen peroxide). However, in some example embodiments, the conductive metal layer 324m may be polished by using the slurry composition for the CMP process, which may not contain the slurry composition.

Figure 7D:
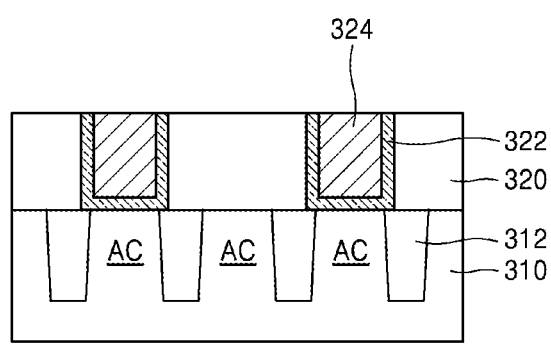
Figure 7D:
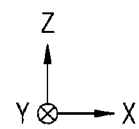

Referring to FIG. 7D, a CMP process may be performed on the exposed barrier metal material layer 322m so that a barrier metal layer 322 may be defined in each of the contact holes and the contact holes may be completely node-separated into one another. To this end, a slurry composition for a CMP process, which contains ceramic particles of which surfaces are modified with specific functional groups, may be used.

The CMP process of FIG. 7D may be performed by using the slurry composition, which does not contain an oxidizer, in the same manner as described with reference to FIG. 7C.

FIGS. 7C and 7D illustrate an example in which two CMP processes are performed by using each of the barrier metal material layer 322m and the interlayer insulating layer 320 as a polishing stop layer. However, in some example embodiments, a single CMP process may be performed by using only the interlayer insulating layer 320 as a polishing stop layer.

In addition, the slurry composition for the CMP process may be controlled to have a pH value of about 1 to 9. However, when a metal layer is polished as shown in FIGS. 7C and 7D, a pH value of the slurry composition for the CMP process may be controlled to be an acidic pH value, for example, 1 to 4.

The plurality of conductive regions 324 may be connected to one terminal of switching devices (not shown) (e.g., field-effect transistors (FETs)) formed on the substrate 310. The plurality of conductive regions 324 may include poly-Si, a metal, a conductive metal nitride, a metal silicide, or a combination thereof, but the inventive concepts are not limited thereto.

Figure 7E:
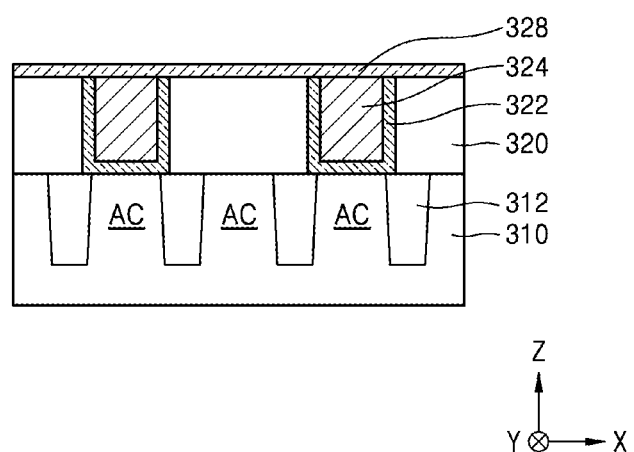
Figure 7F:
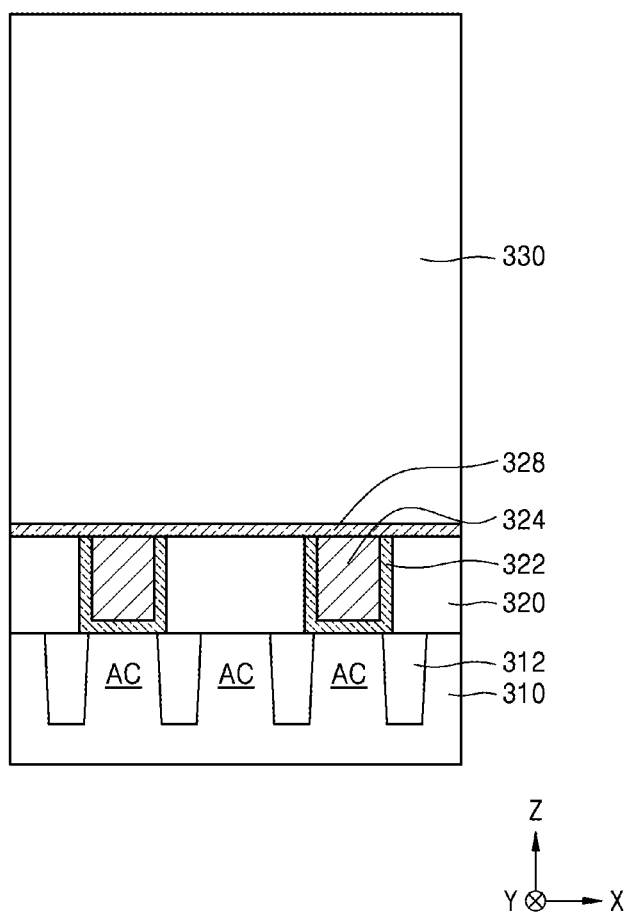

Referring to FIG. 7E, the interlayer insulating layer 320 and the plurality of conductive regions 324 may be covered with an insulating layer 328. The insulating layer 328 may be used as an etch stop layer.

The insulating layer 328 may include an insulating material having an etch selectivity with respect to the interlayer insulating layer 320 and a mold layer 330 (refer to FIG. 7F) formed during a subsequent process. In some example embodiments, the insulating layer 328 may include silicon nitride, silicon oxynitride, or a combination thereof.

In some example embodiments, the insulating layer 328 may be formed to a thickness of about 100 Å to about 600 Å, but the inventive concepts are not limited thereto.

Referring to FIG. 9C, the mold layer 330 may be formed on the insulating layer 328.

In some example embodiments, the mold layer 330 may include an oxide layer. For example, the mold layer 330 may include an oxide layer, e.g., a boro phospho silicate glass (BPSG) layer, a phospho silicate glass (PSG) layer, an undoped silicate glass (USG) layer, a spin on dielectric (SOD) layer, or an oxide layer formed by using a high-density-plasma chemical vapor deposition (HDP CVD) process. The mold layer 130 may be formed by using a thermal CVD process or a plasma CVD process. In some example embodiments, the mold layer 330 may be formed to a thickness of about 1000 Å to about 20000 Å, but the inventive concepts are not limited thereto.

In some example embodiments, the mold layer 330 may include a support layer (not shown). The support layer may include a material having an etch selectivity with respect to the mold layer 330 and have a thickness of about 50 Å to about 3000 Å. When the mold layer 330 is subsequently removed by using a limulus amoebocyte lysate (LAL) lift-off process in an etching atmosphere of, for example, ammonium fluoride (NH4F), hydrofluoric acid (HF), and water, the support layer may include a material having a relatively low etch rate with respect to LAL. In some example embodiments, the support layer may include silicon nitride, silicon carbonitride, tantalum oxide, titanium oxide, or a combination thereof, but a material included in the support layer is not limited thereto.

Figure 7G:
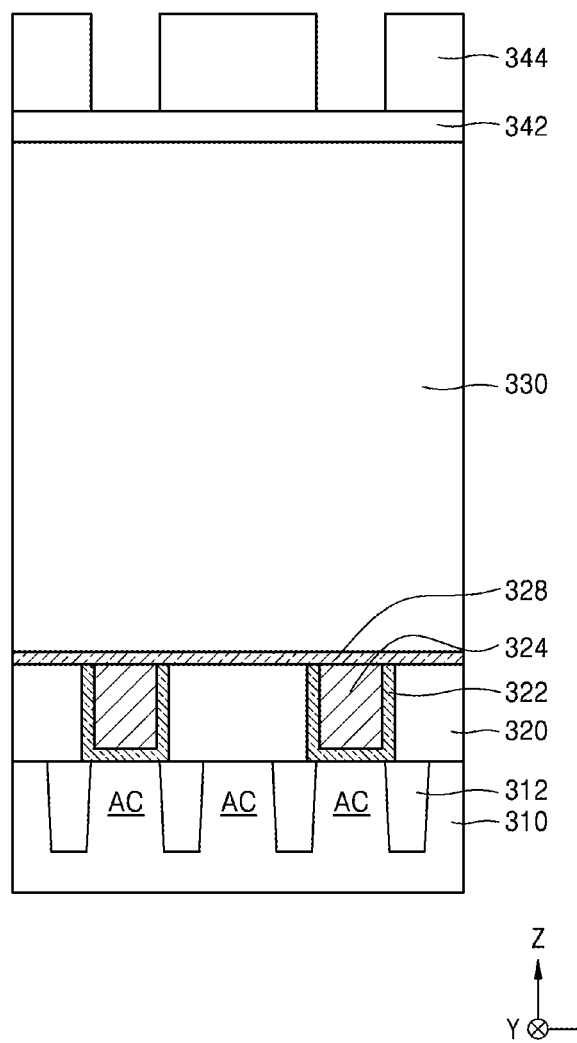

Referring to FIG. 7G, a sacrificial layer 342 and a mask pattern 344 may be sequentially formed on the mold layer 330.

The sacrificial layer 342 may include an oxide layer, e.g., a BPSG layer, a PSG layer, an USG layer, a SOD layer, or an oxide layer formed by using an HDP CVD process. The sacrificial layer 342 may have a thickness of about 500 Å to about 2000 Å. The sacrificial layer 342 may serve to protect the support layer included in the mold layer 330.

The mask pattern 344 may include an oxide layer, a nitride layer, a poly-Si layer, a photoresist layer, or a combination thereof. A region where a lower electrode of a capacitor will be formed may be defined by the mask pattern 344.

Figure 7H:
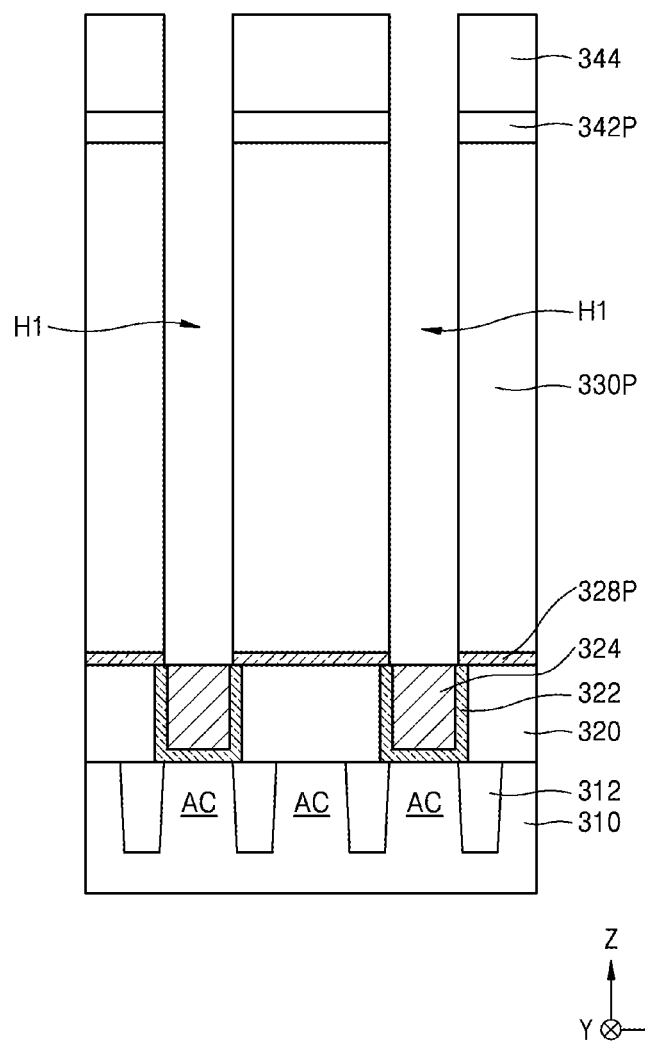

Referring to FIG. 7H, the sacrificial layer 342 and the mold layer 330 may be dry etched by using the mask pattern 344 as an etch mask and using the insulating layer 328 as an etch stop layer, thereby forming a sacrificial pattern 342P and a mold pattern 330P to define a plurality of holes H1.

In this case, the insulating layer 328 may also be etched due to excessive etching, thereby forming an insulating pattern 328P to expose a plurality of conductive regions 324.

Figure 7I:
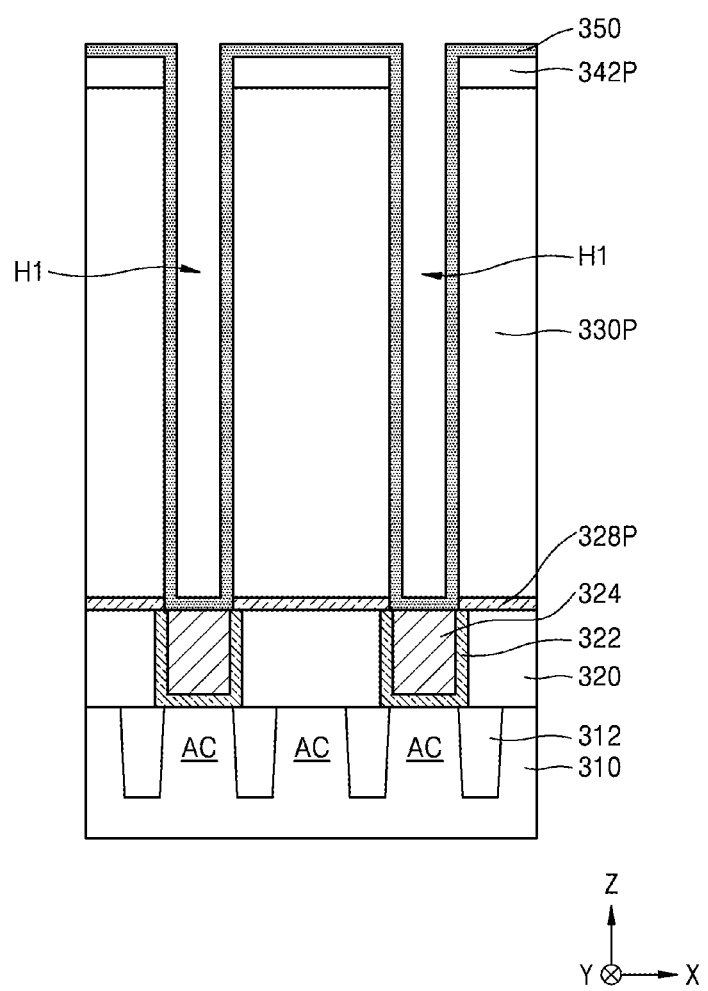

Referring to FIG. 7I, after the mask pattern 344 is removed from the resultant structure of FIG. 7H, a conductive layer 350 for forming a lower electrode may be formed to cover inner sidewalls of the respective holes H1, an exposed surface of the insulating pattern 328P, surfaces of the plurality of conductive regions 324 exposed in the respective holes H1, and an exposed surface of the sacrificial pattern 342P.

The conductive layer 350 for forming the lower electrode may be conformally formed on the inner sidewalls of the plurality of holes H1 to leave partial inner spaces of the respective holes H1.

In some example embodiments, the conductive layer 350 for forming the lower electrode may include a doped semiconductor, a conductive metal nitride, a metal, a metal silicide, a conductive oxide, or a combination thereof. For instance, the conductive layer 350 for forming the lower electrode may include TiN, TiAlN, TaN, TaAlN, W, WN, Ru, $RuO_2$, $SrRuO_3$, Ir, $IrO_2$, Pt, PtO, SRO ($SrRuO_3$), BSRO $(Ba,Sr)RuO_3$), CRO ($CaRuO_3$), LSCo (($La,Sr)CoO_3$), or a combination thereof, but a material included in the conductive layer 350 for forming the lower electrode is not limited thereto.

The conductive layer 350 for forming the lower electrode may be formed by using a CVD process, a metal organic CVD (MOCVD) process, or an ALD process. The conductive layer 350 for forming the lower electrode may be formed to a thickness of about 20 nm to about 100 nm, but the inventive concepts are not limited thereto.

Figure 7J:
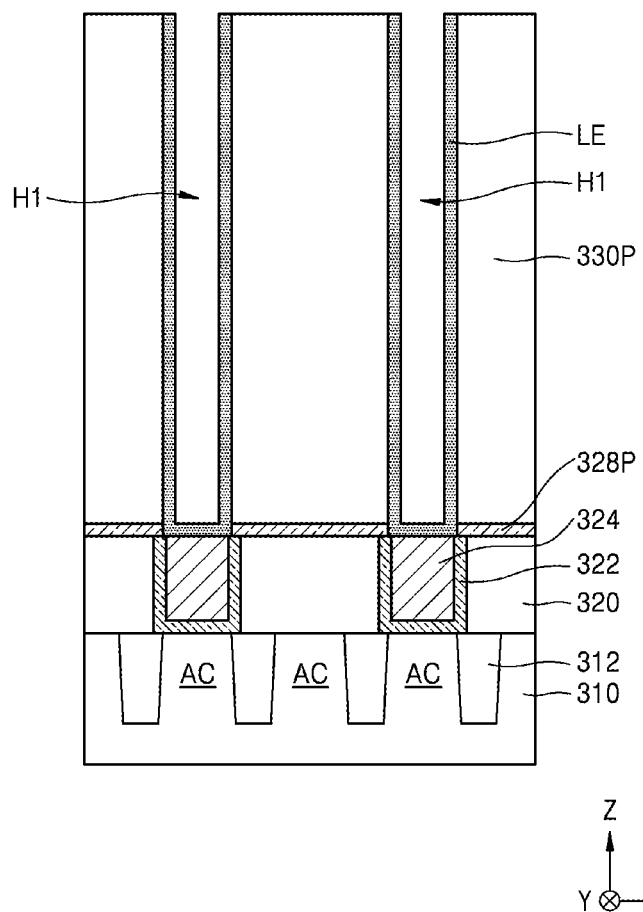

Referring to FIG. 7J, an upper portion of the conductive layer 350 for forming the lower electrode may be partially removed so that the conductive layer 350 for forming the lower electrode may be separated into a plurality of lower electrodes LE.

To form the plurality of lower electrodes LE, the portion of the upper portion of the conductive layer 350 for forming the lower electrode and the sacrificial pattern 342P (refer to FIG. 7I) may be removed by using an etchback process or a chemical mechanical polishing (CMP) process until a top surface of the mold pattern 330P is exposed.

The plurality of lower electrodes LE may penetrate the insulating pattern 328P and be connected to the conductive regions 324.

Figure 7K:
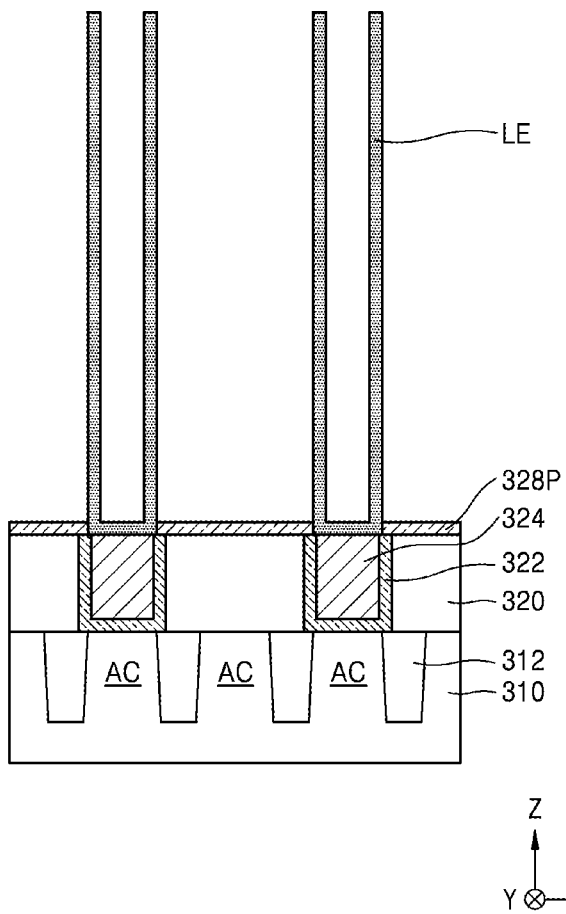
Figure 7L:
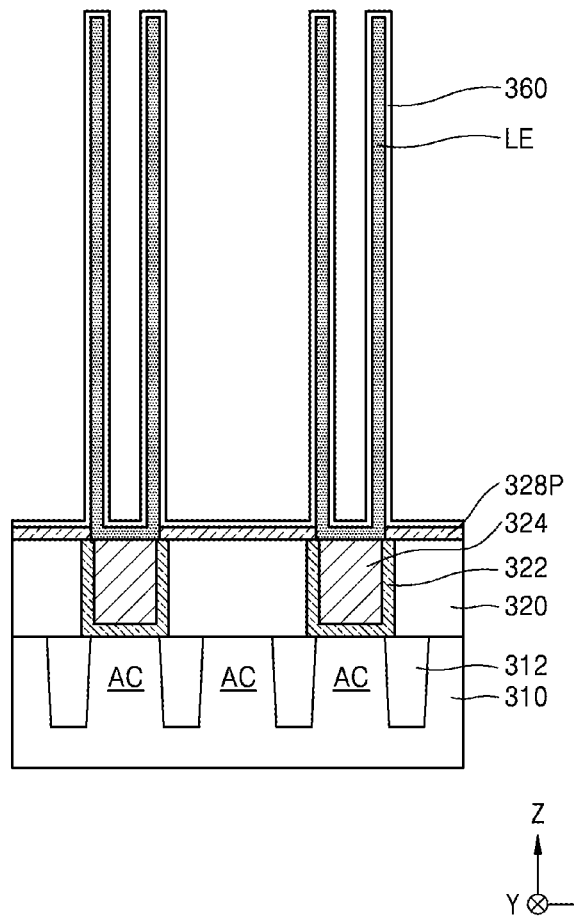
Figure 7M:
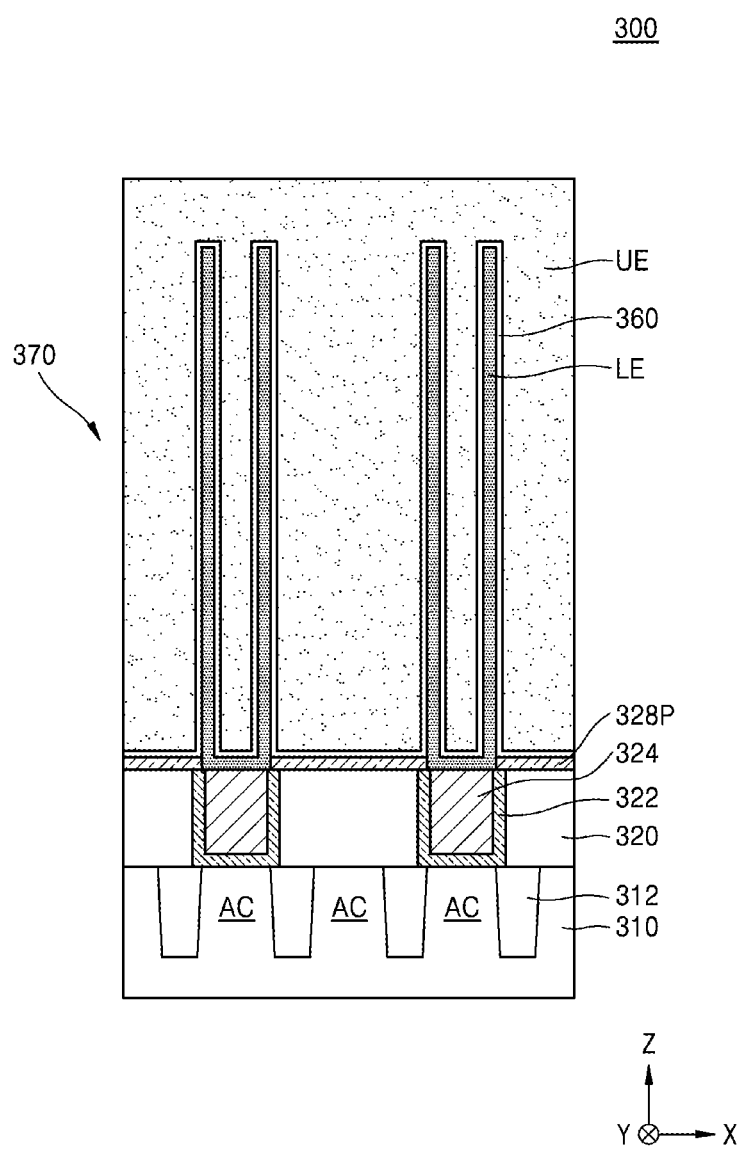

Referring to FIG. 7K, the mold pattern 330P may be removed to expose outer wall surfaces of the plurality of lower electrodes LE having cylindrical shapes.

The mold pattern 330P may be removed by a lift-off process using LAL or hydrofluoric acid.

Referring to FIG. 7I, a dielectric layer 360 may be formed on the plurality of lower electrodes LE.

The dielectric layer 360 may be formed to conformally cover exposed surfaces of the plurality of lower electrodes LE.

The dielectric layer 360 may be formed by using an ALD process.

The dielectric layer 360 may include an oxide, a metal oxide, nitride, or a combination thereof. In some example embodiments, the dielectric layer 360 may include a ZrO2 layer. For example, the dielectric layer 360 may include a single ZrO2 layer or a multilayered structure including a combination of at least one ZrO2 layer and at least one of Al2O3 layer.

In some example embodiments, the dielectric layer 360 may have a thickness of about 50 Å to about 150 Å, but the inventive concepts are not limited thereto.

Referring to FIG. 7E, an upper electrode UE may be formed on the dielectric layer 360.

A capacitor 370 may be configured by the lower electrode LE, the dielectric layer 360, and the upper electrode UE.

The upper electrode UE may include a doped semiconductor, a conductive metal nitride, a metal, a metal silicide, a conductive oxide, or a combination thereof. For example, the upper electrode UE may include TiN, TiAlN, TaN, TaAlN, W, WN, Ru, $RuO_2$, $SrRuO_3$, Ir, $IrO_2$, Pt, PtO, SRO ($SrRuO_3$), BSRO ($Ba,Sr)RuO_3$), CRO ($CaRuO_3$), LSCo (($La,Sr)CoO_3$), or a combination thereof, but a material included in the upper electrode UE is not limited thereto.

The upper electrode UE may be formed by using a CVD process, an MOCVD process, a physical vapor deposition (PVD) process, or an ALD process.

Thus far, the method of manufacturing the semiconductor device 300 including the process of forming the dielectric layer 360 to cover the surfaces of the lower electrodes LE having cylindrical shapes has been described with reference to FIGS. 7A to 7M, but the inventive concepts are not limited thereto. For example, pillar-type lower electrodes having no inner spaces may be formed instead of the lower electrodes LE having cylindrical shapes. The dielectric layer 360 may be formed on the pillar-type lower electrodes.

In the method of manufacturing the semiconductor device 300 according to example embodiments as described with reference to FIGS. 7A to 7M, a CMP process may be performed by using the slurry composition for the CMP process according to example embodiments to form the barrier metal layer 322 and the conductive regions 324.

While the inventive concepts have been particularly shown and described with reference to example embodiments thereof, it will be understood that various changes in form and details may be made therein without departing from the spirit and scope of the following claims.

What is claimed is:

1. A slurry composition for a chemical mechanical polishing (CMP) process, the slurry composition comprising:
   a dispersion medium; and
   ceria particles having a NO₃ functional group bonded to surfaces thereof, the ceria particles being contained in an amount of about 0.1 parts by weight to about 15 parts by weight based on 100 parts by weight of the dispersion medium wherein an oxidizer is not included in the slurry composition.

2. The slurry composition of claim 1, wherein a pH value of the slurry composition ranges from 1 to 9.

3. The slurry composition of claim 2, further comprising a pH control agent.

4. The slurry composition of claim 1, wherein a Fourier-transform infrared spectroscopy (FT-IR) spectrum for the ceria particles has a peak at a position ranging from about 1250 cm$^{-1}$ to about 1400 cm$^{-1}$ or a position ranging from about 1500 cm$^{-1}$ to about 1.700 cm$^{-1}$.

5. The slurry composition of claim 1, wherein a zeta potential value of the ceria particles is larger than 0 in at least a pH range of 0 to 9.5.

6. The slurry composition of claim 1, wherein a polishing accelerator is not included in the slurry composition.

7. The slurry composition of claim 1, wherein the ceria particles have an average particle diameter of about 1 nm to about 150 nm.

8. The slurry composition of claim 7, wherein the ceria particles have an average particle diameter of about 1 nm to about 80 nm.

9. The slurry composition of claim 8, wherein a polishing rate ranges from about 3000 Å/min to about 6000 Å/min when the CMP process is performed using the slurry composition at a pH value of about 7.0 and while applying a pressure of about 4 psi to a silicon oxide layer.

10. The slurry composition of claim 8, wherein a polishing rate ranges from about 400 Å/min to about 1000 Å/min when the CMP process is performed using the slurry composition at a pH value of about 2.0 and while applying a pressure of about 4 psi to a silicon oxide layer.

11. The slurry composition of claim 8, wherein a polishing rate ranges from about 400 Å/min to about 1000 Å/min when the CMP process is performed using the slurry composition at a pH value of about 2.0 and while applying a pressure of about 4 psi to one of a tungsten (W) layer and a copper (Cu) layer.

12. The slurry composition of claim 8, wherein a polishing rate ranges from about 50 Å/min to about 400 Å/min when the CMP process is performed using the slurry composition at a pH value of about 2.0 and while applying a pressure of about 4 psi to a silicon nitride layer.

13. A slurry composition for a chemical mechanical polishing (CMP) process, the slurry composition comprising:
    ceramic particles having a surface-modifying functional group bonded to surfaces thereof, the surface-modifying functional group including at least one of a nitrate group (NO₃), a carbonate group (CO₃), a sulfate group (SO₄), an oxalate group (C₂O₄), and a methane sulfonate group (CH₃SO₃);
    a pH control agent; and
    a dispersion medium wherein an oxidizer is not included in the slurry composition.

14. The slurry composition of claim 13, wherein the ceramic particles include at least one of ceria, silica, alumina, and titania.

15. The slurry composition of claim 13, wherein the ceramic particles have an average particle diameter of about 1 nm to about 150 nm.

16. The slurry composition of claim 13, wherein the ceramic particles are contained in an amount of about 0.1 to 15 parts by weight based on 100 parts by weight of the dispersion medium.

17. The slurry composition of claim 16, wherein a polishing accelerator is not contained in the slurry composition, the polishing accelerator being one of an anionic oligomer, an anionic polymer, hydroxyl acid, and amino acid.

* * * * *